United States Patent [19]

Reckziegel et al.

[11] 3,775,146

[45] Nov. 27, 1973

[54] HOT MELT ADHESIVE COMPOSITIONS

[75] Inventors: Erick Reckziegel, Dusseldorf-Eller; Wolfgang Mehmel, Duisburg, both of Germany

[73] Assignee: Henkel & Cie GmbH, Dusseldorf-Holthausen, Germany

[22] Filed: Mar. 4, 1971

[21] Appl. No.: 121,216

[30] Foreign Application Priority Data

Mar. 13, 1970 Germany.................. P 20 11 971.5

[52] U.S. Cl.................. 106/218, 106/231, 106/239, 156/332, 260/27 R, 260/410.5

[51] Int. Cl............................................. C08h 11/04

[58] Field of Search............ 260/27 EV, 410, 410.5; 106/218, 173 R

[56] References Cited

UNITED STATES PATENTS 3,421,910 1/1969 Gilson et al........................ 106/239

3,492,258 1/1970 Kremer................................ 260/27

*Primary Examiner*—Donald E. Czaja
*Assistant Examiner*—William E. Parker
*Attorney*—Hammond & Littell

[57] ABSTRACT

A hot melt adhesive composition capable of emulsification in water comprising (1) from 35 to 95 percent by weight of natural resins selected from the group consisting of tall oil resins and colophony resins, (2) from 5 to 30 percent by weight of a surface-active polyethylene oxide adduct having a Griffin HLB value of from 10 to 20, (3) from zero to 30 percent by weight of ethylene/vinyl acetate copolymers having from 25 to 45 mol percent of vinyl acetate, and (4) from zero to 25 percent by weight of high-boiling hydrocarbons.

4 Claims, No Drawings

HOT MELT ADHESIVE COMPOSITIONS

THE PRIOR ART

Hot melt adhesives based on tall oil resins and colophony resins such as root resins are used as quick-setting adhesives for a large variety of purposes, for example for bonding heavy papers or for sticking on labels or tags or as so-called accompanying glue for paper wrapping machines. A disadvantage of the usual hot melt adhesives, however, is that they are very difficult to detach again by water.

OBJECTS OF THE INVENTION

An object of the present invention is the development of hot melt adhesive compositions based on tall oil resins and colophony resins which are readily detached again by slightly heated water.

Another object of the invention is the development of a hot melt adhesive composition capable of emulsification in water comprising (1) from 35 to 95 percent by weight of natural resins selected from the group consisting of tall oil resins and colophony resins, (2) from 5 to 30 percent by weight of a surface-active polyethylene oxide adduct having a Griffin HLB value of from 10 to 20, (3) from zero to 30 percent by weight of ethylene/vinyl acetate copolymers having from 25 to 45 mol percent of vinyl acetate, and (4) from zero to 25 percent by weight of high-boiling hydrocarbons.

These and other objects of the invention will become apparent as the description thereof proceeds.

DESCRIPTION OF THE INVENTION

The hot melt adhesives according to the invention, based on tall oil resins and/or colophony resins, are characterized in that they have a content of 5 to 30 percent by weight of surface-active polyethylene oxide adducts, which have an HLB value according to Griffin of 10 to 20. The HLB value (hydrophilic-hydrophobic-balance) characterizes the amphipolar construction of the surface-active molecule [see Ullmann "Encyclopaedia of Technical Chemistry" Vol. 16 (1965), page 742]. It is calculated according to the empirical formula $HLB=2o[1-(Mo/M)]$, in which $Mo$ is the weight of the hydrophobic part of the molecule and $M$ is the weight of the whole molecule.

Suitable polyethylene oxide adducts are derived, for example, from fatty acid partial esters of hexahydric alcohols or their internal anhydrides. The fatty acid residue should have 12 to 18 carbon atoms. Polyethylene oxide adducts of sorbitol-monopalmitate have proved very good in practice. Further, adducts of sorbitol laurate, stearate or oleate are also suitable. In order to adjust the HLB value to the above-described range, about 20 to 80 ethylene oxide groups must be added on the said fatty acid ester.

A further group of surface-active polyethylene oxide adducts which are able to convert the hot melt adhesives into the water-soluble form are the polyethylene oxide adducts of fatty alcohols or alkylphenols with six to 10 carbon atoms in the alkyl group. The fatty alcohols should contain 12 to 18 carbon atoms. About 10 to 50 mol of polyethylene oxide groups should be added to the fatty alcohols or alkylphenols in order to adjust the HLB value to the desired value.

Finally, adducts of polyethylene oxide to polyoxypropylene glycol may also be used for the hot melt adhesives according to the invention. These substances are also commercially available.

The polyethylene oxide adducts are used in the above indicated amount, the water-solubility of the hot melt adhesives increasing with an increasing amount of the adducts.

The hot melt adhesives according to the invention are synthesized on the basis of tall oil resins and/or colophony resins in known way.

Tall oil resins may also be used which still contain certain amounts of resin pitch and also free fatty acids. The amount of free fatty acids in the resins may lie between 5 and 35 percent. The saponification value of such resins should be between 100 and 160. In addition to pure colophony resins, so-called root resins, which may contain up to 10 percent of unsaponifiable matter are also suitable. The saponification value of such resins should be between 130 and 160.

According to a preferred form, the hot melt adhesives according to the invention contain, in addition, ethylene/vinyl acetate-copolymers containing 25 to 45 mol percent of vinyl acetate and/or high-boiling hydrocarbons. The high-boiling hydrocarbons concerned boil at temperatures of over 325° C and are so-called spindle or machine-oil refined products or microcrystalline hydrocarbons which are called microwax. The fraction of the ethylene/vinyl acetate-copolymers should not exceed 30 percent and of the high-boiling hydrocarbons should not exceed 25 percent. Preferably at least 10 to 100 percent of the ethylene/vinyl acetate copolymer should contain between 40 and 45 percent of vinyl acetate.

The hot-melt adhesive composition of the present invention therefore comprises a composition capable of emulsification in water comprising (1) from 35 to 95 percent by weight of natural resins selected from the group consisting of tall oil resins and colophony resins (2) from 5 to 30 percent by weight of a surface-active polyethylene oxide adduct having a Griffin HLB value of from 10 to 20, (3) from zero to 30 percent by weight of ethylene/vinyl acetate copolymers having from 25 to 45 mol percent of vinyl acetate, and (4) from zero to 25 percent by weight of high-boiling hydrocarbons.

The hot melt adhesives according to the invention may also contain the usual assistants, for example, stabilizers against thermal decomposition, antioxidants, dyestuffs or pigments such as titanium dioxide or chalk.

For the preparation of the adhesives according to the invention the individual components are melted and heated to a temperature of 100° to 200° C. At this temperature the components are homogenized by mixing. They are then allowed to cool.

The hot melt adhesives according to the invention are marked mostly by a relatively low processing temperature, since a viscosity which permits a coating of the adhesive is often attained even at temperatures of 80° to 90° C.

According to the content of surface-active polyethylene oxide or polyethylene oxide adducts, the hot melt adhesives dissolve in water at room temperature or emulsify in water at 80° to 100° C. Owing to the solubility or emulsifiability in water, labels stuck on bottles or other containers, for example, can easily be removed again. Residues of paper wrappings can easily be fed back again into the hollander or beater and worked up in the paper manufacture.

The invention will be illustrated with reference to the following examples which are not limitative in any respect.

EXAMPLE 1

A mixture of the following components was made by mixing at 110° C:

700 gm of root resin (melting point 100° C determined by the Ball and Ring method, acid value 145, saponification value 150; content of unsaponifiable matter 8 percent)

250 gm of hydrocarbon (standard lubricating oil, neutral, flash point about 150° C; solidifying point –46° C; viscosity, 14 cp at 20° C)

50 gm of polyethylene oxide adduct of sorbitol-monopalmitate (40 ethylene oxide groups per molecule; HLB value 15.6).

The hot melt adhesive made from the above components had a viscosity of 1,100 cP at 50° C, 500 cP at 60° C and 200 cP at 70° C. The measurements were carried out in a viscosimeter according to Epprecht.

The adhesive was soluble in water at 20° C. With it, paper was bonded with cardboard and glass bottles. Moreover, paper was stuck on previously untreated polyethylene surfaces. All the bonds could be released again with water.

EXAMPLE 2

A hot melt adhesive of the following composition was made by mixing at 175° C:

850 gm of tall oil resin (softening point determined by the Ball and Ring method, 20° to 25° C; saponification value 140; acid value 105; content of fatty acids 25 percent)

50 gm of an ethylene/vinyl acetate copolymerizate with a content of 43 mol percent of vinyl acetate 100 gm of polyethylene oxide adduct of a mixture of $C_{12}$to $C_{18}$ fatty alcohols (on an average 10 mol of ethylene oxide were added on per mol of fatty alcohol; HLB value 13.5.)

The hot melt adhesive thus prepared showed the following viscosities in cP when measured in viscosimeter according to Epprecht:

| Temperature in °C | Viscosity in cP |
|---|---|
| 50 | 7400 |
| 60 | 3200 |
| 70 | 1500 |
| 80 | 800 |
| 90 | 500 |

The adhesive was soluble in water at 20° C. A variety of papers were bonded with it. All bonds could easily be released again with water.

EXAMPLE 3

A hot melt adhesive was made by melting the following components and homogenizing them at 170° C:

400 gm of root resin as in Example 1

200 gm of an ethylene/vinyl acetate copolymerizate (28 mol percent of vinyl acetate groups)

50 gm of an ethylene/vinyl acetate copolymerizate (40 mol percent of vinyl acetate groups)

50 gm of waxlike microcrystalline hydrocarbon (melting point 27° to 32° C; dropping point according to Ubbelohde 78° to 80° C)

300 gm of polyethylene oxide adduct of a mixture of $C_{12}$ to $C_{18}$ fatty alcohols.

The hot melt adhesive, thus obtained, had the following viscosities at various temperatures, measured in a viscosimeter according to Epprecht:

| Temperature in °C | Viscosity in cP |
|---|---|
| 140 | 1600 |
| 150 | 1300 |
| 160 | 1000 |

The adhesive was sparingly soluble in water at 30° C and readily soluble in water at 95° C. Paper and cardboard were bonded therewith. The bonds could easily be released again with warm water.

EXAMPLE 4

A hot melt adhesive was made by melting the following components and homogenizing them at 170° C:

400 gm of root resin as in Example 1

200 gm of ethylene/vinyl acetate copolymerizate (28 mol percent of vinyl acetate groups)

50 gm of ethylene/vinyl acetate copolymerizate (40 mol percent of vinyl acetate groups)

150 gm of waxlike microcrystalline hydrocarbon as in Example 3, 200 gm of polyethylene oxide adduct of polypropylene oxide (molecular weight 1750; HLB value about 16)

The hot melt adhesive thus obtained had the following viscosities at various temperatures, measured in a viscosi-meter according to Epprecht:

| Temperature in °C | Viscosity in cP |
|---|---|
| 140 | 1600 |
| 150 | 1300 |
| 160 | 1000 |

The adhesive dissolved slowly in water at 25° C, but on the other hand quickly in water at 100° C. Paper was bonded with cardboard and with pretreated polyethylene surfaces. The bonds could be released again with warm water.

The preceding specific embodiments are illustrative of the practice of the invention. It is to be understood, however, that other expedients known to those skilled in the art,or disclosed herein, may be employed without departing from the spirit of the invention or the scope of the appended claims.

We claim:

1. A hot melt adhesive composition capable of emulsification in water consisting essentially of (1) from 35 to 95 percent by weight of natural resins selected from the group consisting of tall oil resins and colophony resins, (2) from 5 to 30 percent by weight of a surface-active polyethylene oxide adduct having a Griffin HLB value of from 10 to 20, (3) from zero to 30 percent by weight of ethylene/vinyl acetate copolymers having from 25 to 45 mol percent of vinyl acetate, and (4) from zero to 25 percent by weight of high-boiling hydrocarbons which boil at a temperature above 325° C.

2. The adhesive composition of claim 1 wherein said surface-active polyethylene oxide adduct is a polyethylene oxide adduct of a partial fatty acid ester with a hexahydric alcohol or an internal anhydride thereof.

3. The adhesive composition of claim 1 wherein said surface-active polyethylene oxide adduct is a polyethylene oxide adduct of an alcohol selected from the group consisting of fatty alcohols having 12 to 18 carbon atoms and alkylphenols having six to 10 carbon atoms in the alkyl.

4. The adhesive composition of claim 1 wherein said surface-active polyethylene oxide adduct is a polyethylene oxide adduct of polyoxypropylene glycol.

* * * * *